United States Patent [19]

Mode

[11] Patent Number: 4,508,369
[45] Date of Patent: Apr. 2, 1985

[54] RELEASABLE COUPLING DEVICE

[75] Inventor: Paul Mode, Westfield, N.J.

[73] Assignee: Nycoil Corporation, Fanwood, N.J.

[21] Appl. No.: 109,680

[22] Filed: Jan. 4, 1980

Related U.S. Application Data

[63] Continuation-in-part of Ser. No. 912,003, Jun. 2, 1978, Pat. No. 4,440,424.

[51] Int. Cl.³ .............................................. F16L 35/00
[52] U.S. Cl. ..................................... 285/39; 285/105; 285/238; 285/323; 285/340
[58] Field of Search ................. 285/39, 105, 323, 322, 285/238, 340

[56] References Cited

U.S. PATENT DOCUMENTS

| | | | |
|---|---|---|---|
| 3,743,326 | 7/1973 | Courtot et al. | 285/323 X |
| 3,815,940 | 6/1974 | Luckenbill | 285/105 |
| 3,909,046 | 9/1975 | Legris | 285/39 |
| 4,021,062 | 5/1977 | Mariaulle | 285/39 |
| 4,062,574 | 12/1977 | Scholin | 285/340 |
| 4,123,090 | 10/1978 | Kotsakis et al. | 285/39 |
| 4,146,254 | 3/1979 | Turner et al. | 285/105 |
| 4,240,651 | 12/1980 | Mariaulle | 285/39 |

Primary Examiner—Thomas F. Callaghan
Attorney, Agent, or Firm—Lerner, David, Littenberg Krumholz & Mentlik

[57] ABSTRACT

An improved releasable coupling device for a tube of the type which includes a fitting having a bore communicable with a source of fluid and an opening into the bore through which the tube is to be inserted, a retaining ring in the opening having a plurality of axially extending inwardly biased fingers adapted to engage the tube when the tube is inserted into the fitting towards the bore, and an unlocking collar for forcing the plurality of fingers radially outward to cause disengagement of the fingers from the tube. An annular sealing member is positioned in the opening axially between the fingers and the end of the opening adjacent the bore for engaging the tube and the wall of the opening to seal the tube in the fitting when the tube is inserted therethrough, and which is in engagement with the fingers. The annular sealing member is adapted to exert an axially directed force towards the fingers when subjected to the pressure of the fluid communicating with the bore. The fingers include an inclined surface which is engagable by the annular sealing member for increasing the inward biasing force on the fingers, thereby minimizing the possibility of accidental release of the gripping force applied by the fingers. Preferably, each of the fingers has a gripping portion comprised of opposing substantially planar surfaces which minimize the possibility of scratching or marring the tube during insertion of the tube. Also, the unlocking collar is provided with a continuous bead around the inside circumference thereof for engaging the tube when the tube is inserted into the opening, the bead being axially located in close proximity to the annular sealing member.

10 Claims, 20 Drawing Figures

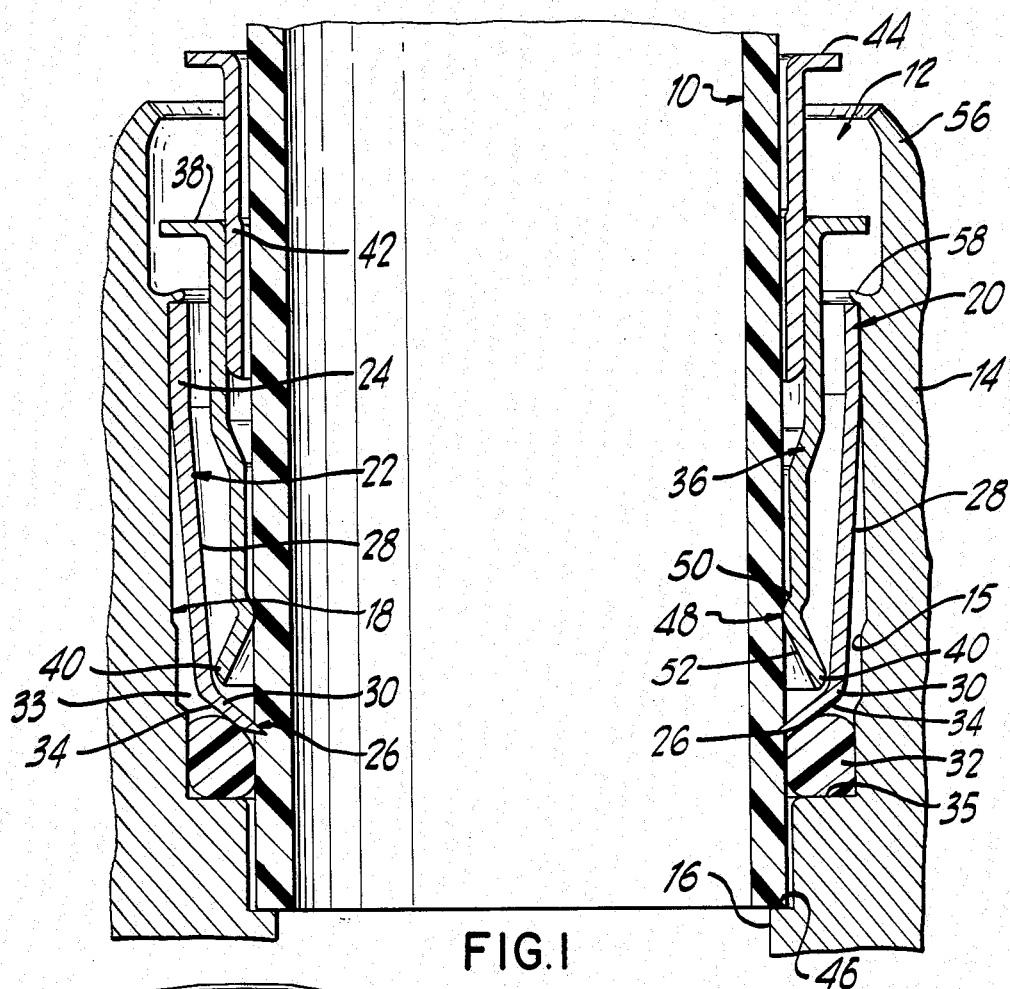
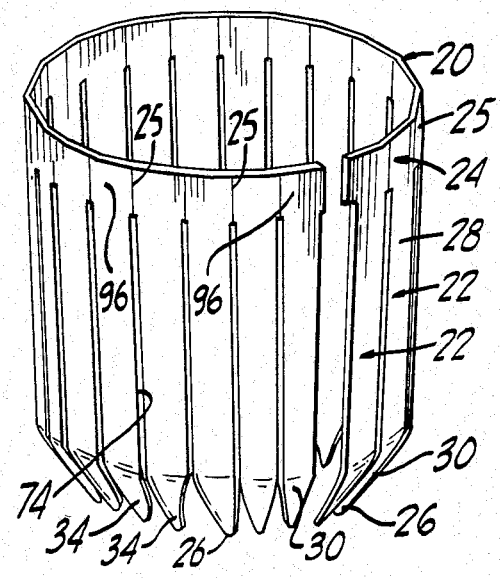
FIG. 2
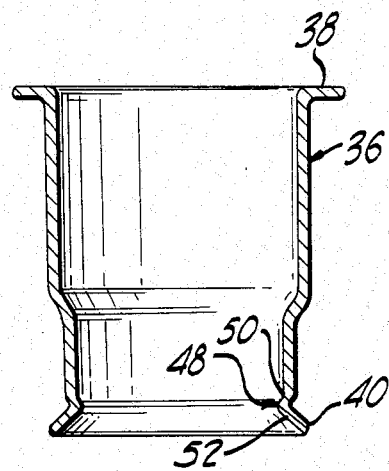
FIG. 3
FIG. 1

4,508,369

RELEASABLE COUPLING DEVICE

This is a continuation-in-part application of copending application Ser. No. 912,003, filed June 2, 1978 and now U.S. Pat. No. 4,440,424.

BACKGROUND OF THE INVENTION

The present invention relates to coupling assemblies for conduits or tubes used to carry fluid (e.g., liquid, air, gas, etc.), and more particularly, to releasable coupling devices by which a tube or conduit inserted into the coupling device may be disengaged and withdrawn therefrom. Such coupling devices are particularly useful with hydraulic or pneumatic equipment for automatic operation, the coupling devices being used to make either joints between two tubes or conduits, or joints between tubes and the pneumatic or hydraulic component part of such equipment.

Releasable coupling devices are generally known in the art. Such known devices generally comprise a coupling member having a bore into which a conduit or tube to be connected or coupled thereto is introduced and held thereinplace by action of gripping teeth of a retaining element which is inserted in the radial gap between the bore and the tube. An unlocking member is generally provided which is adapted to release the gripping action of the teeth. The known devices also generally include a sealing or packing ring for sealing the bore and the conduit or tube inserted thereinto to prevent leakage of fluid between the coupling member and the conduit or tube coupled thereto.

The manufacturing process for the retaining element and gripping fingers of the prior art devices has generally included first forming a cup shaped member from a metallic plate, such as for example, by drawing or bending the metal, and then, cutting out the bottom of the cup and portions of the sides to provide a plurality of gripping fingers depending from a completely closed ring shaped member. The formed gripping fingers can be biased further inwardly, such as by bending or if the cup-shaped member initially has inclined sides, the formed gripping fingers may be sufficiently inclined without further bending to provide inwardly biased fingers. Such a manufacturing process often leaves burrs or sharp edges on the gripping fingers which causes the exterior surfaces of the tube or conduit to be scratched or marred upon insertion of the tube or conduit.

Consequently, if the sealing or packing ring is disposed below the elevation of the gripping fingers, i.e., between the end of the bore at the interior of the coupling member and the end of the gripping fingers, as shown for example in U.S. Pat. No. 3,909,046 for "Connector for Fluid Conduits, Such as Semi-Rigid Pipes" issued Sept. 30, 1975 to Legris, the sealing or packing O-ring may not serve to adequately seal and prevent leakage of fluid from the interior of the coupling body around the exterior of the tube, i.e., along the serrated portions of the exterior of the tube. In other words, because of the composition and the materials used and the manufacturing process for making such components, an adequate seal may not be provided by the sealing ring since the sealing ring may not deform to a sufficient extent to fill the grooves in the outer surface of the tube caused by the gripping fingers upon insertion of the tube. As can be appreciated, such an arrangement is disadvantageous where it is desired to prevent any leakage. Further, such prior art devices such as shown in the Legris patent have been found to unexpectedly release or unlock the tube from gripping engagement as a result of vibrations when the fluid pressure is lowered.

Another prior art coupling assembly is disclosed in U.S. Pat. No. 4,021,062 for "Coupling Assemblies" issued May 3, 1977 to Mariaulle. The coupling assembly of this prior art device is adapted to be inserted and cemented in place in the bore of a fitting for coupling a tube to the fitting, and comprises a retaining ring having a plurality of gripping fingers inwardly biased and an unlocking ring between the retaining ring and the conduit or tube to be inserted therethrough. Again, the unlocking ring is operable, on being pushed axially, to spread the gripping teeth of the retaining ring to release the tube or conduit. Two generally different sealing arrangements or embodiments are disclosed in this patent. One embodiment, like that of the Legris patent, has the sealing O-ring disposed below the gripping fingers, and accordingly, is subject to the same limitations and disadvantages discussed above with respect to Legris—namely, the possibility of not providing a complete and adequate seal since the hard packing ring may be incapable of filling in grooves or serrations on the outer surface of the conduit caused by the gripping fingers upon insertion of the conduit. The other sealing embodiment of the Mariaulle patent discloses a fluid tight packing O-ring being interposed either between the unlocking ring and the gripping fingers or between adjacent halves of the unlocking ring so that the axial unlocking force is transmitted through the packing ring. Accordingly, the axial unlocking force must be greater than is normally necessary to cause unlocking of the gripping fingers since part of the force is dissipated in or absorbed by the non-rigid, deformable packing O-ring. Thus, this sealing arrangement is also disadvantageous as it is more difficult to cause disengagement of the gripping fingers from the conduit or tube.

Some of these limitations and disadvantages of the prior art are overcome by the device of the aforementioned application Ser. No. 912,003 now U.S. Pat. No. 4,440,424. In that application, there is disclosed an improved releasable coupling device in which the unlocking collar is axially movable relative to the retaining ring for direct engagement with the fingers upon axial movement towards the fingers to force a plurality of fingers radially outward to cause disengagement of the gripping portions from the tube and in which sealing means are positioned axially between the gripping portions of the fingers and the open end of the fitting for sealing the tube in the fitting. The sealing means comprise a fluid tight packing ring fitted in the opening above the retaining ring between the inside wall of the opening and the outside wall of the unlocking collar, and a continuous dimple or bead around the inside circumference of the unlocking collar which is adapted to engage the outside surface of the tube which is inserted into the opening of the fitting. In this way, the problem of providing adequate sealing of serrations or grooves in the outside of the tube caused upon insertion into the fitting is avoided since the sealing means is positioned above the gripping portions of the fingers and thus above the elevation of any possible serrations.

SUMMARY OF THE INVENTION

In accordance with one aspect of the present invention there is provided an improved releasable coupling device of the type which includes a fitting having a bore communicable with a source of fluid and an opening into the bore through which the tube is to be inserted, the internal diameter of the opening being greater than the diameter of the bore and the opening having a first end adjacent the bore and a second end open to the exterior of the fitting, a retaining ring in the opening having a plurality of axially extending, inwardly biased fingers adapted to engage the tube when the tube is inserted into the fitting towards the bore so that the tube is restrained against axial movement out of the fitting, and unlocking means for forcing the plurality of fingers radially outward to cause disengagement of the fingers from the tube. The improvement comprises each of the fingers of the retaining ring have gripping portions at the ends thereof for engaging the tube, the gripping portions have opposing substantially planar surfaces, and an annular sealing member positioned axially between the fingers and the first end of the opening for engaging the tube and the wall of the opening to seal the tube and the fitting when the tube is inserted therethrough. More preferably, the fingers along their entire length have a substantially rectangular cross-section.

In other words, the fingers, and in particular the gripping portions, are substantially flat. This is particularly advantageous since such gripping fingers have been found to be substantially free of any burrs or serrations at the ends thereof, and consequently will not mar or scratch the outside surface of the tube upon insertion of the tube past the gripping fingers. Thus, the problems and limitations of the prior art with respect to providing an adequate seal with an annular sealing member located axially between the ends of the gripping fingers and the bore is greatly minimized.

According to another aspect of the present invention, the annular sealing member is positioned in the opening axially between the fingers and the first end of the opening, and is adapted to exert a force in an axial direction towards the second end of the opening when subjected to the pressure of the fluid communicating with the bore when the tube has been inserted through the annular sealing member. Also, means are provided engageable with the annular sealing member and associated with the inwardly biased fingers for increasing the inward biasing force of the fingers in response to the axially directed force exerted by the annular sealing member. In this way, the possibility of disengagement of the fingers from the tube as a result of vibrations or other disturbances is minimized.

In the preferred embodiment, the means engagable by the annular sealing member comprise inclined surfaces on the gripping fingers oriented in a direction to bias the fingers radially inward when subjected to a force directed axially towards the second end of the opening, and the annular sealing member is engagable with the inclined surfaces when subjected to the pressure of the fluid communicating with the bore to thereby increase the inward biasing force on the fingers. Further in accordance with the preferred embodiment, portions of the gripping fingers are spaced radially inward from the wall of the opening and the sealing member is deformable so as to partially deform into the space between the portions of the fingers in the wall to increase the biasing force radially inward on the fingers.

According to a still further aspect of the present invention, the annular sealig member is axially positioned in the opening axially between the fingers and the first end of the opening to engage the fingers so that the fingers and the annular sealing member are in engagement with one another both when the tube is inserted in the device and gripped by the fingers or when the fingers have been forced radially outward to cause disengagement with the tube as well as prior to insertion of a tube thereto. This arrangement is particularly advantageous in ensuring that the tube is both locked in place by engagement of the fingers and also sealed by the annular sealing member since positioning of the annular sealing member immediately adjacent the ends of the fingers allows for the tube to be both inserted past the fingers and the sealing member substantially simultaneous with only a single resistance to insertion being encountered.

According to another aspect of the present invention, the ends of each of the fingers of the retaining ring are inclined radially inward at a first predetermined axial location between the ends of the fingers and the retaining ring with the fingers being spaced about the retaining ring a predetermined distance from one another such that the fingers will engage one another at a second predetermined axial location between the first predetermined axial location and the axial location of the ends of the fingers when the fingers are bent radially inward about a line at the first predetermined axial location. This is particularly advantageous since such engagement between the fingers minimizes the possibility of the tube or conduit being pulled outwardly out of the fitting without actuation of the unlocking collar. Specifically, if the tube is pulled or pushed in a direction axially out of the fitting, the fingers of the retaining ring will engage one another at an axial location below the axial location at which the fingers are inclined, thereby tending to prevent further bending of the fingers abut a line at the location of the incline. Simply stated, the fingers are spaced about the retaining ring in a manner such that they will not be able to bend about the line at the first axial location in a direction radially inward and thus axially upwardly if the tube is attempted to be pulled out of the fitting. This is also advantageous in limiting the amount of penetration of the ends of the fingers into the tube, and in particular in ensuring that the fingers do not completely penetrate through the tube.

According to a still further aspect of the present invention, the unlocking means comprises an unlocking collar positioned inside the retaining ring in the opening and axially movable relative to the retaining ring for direct engagement with the fingers upon axial movement towards the fingers to force the plurality of fingers radially outward to cause disengagement of the gripping portions of the tube. The unlocking collar has a continuous bead about the inside circumference thereof adapted to engage the outside surface of the tube when the tube is inserted into the opening in the fitting, the continuous bead being axially located adjacent the end of the unlocking collar which is adapted to engage the fingers. Also, annular sealing means are provided for engaging the tube and the wall of the opening when the tube is inserted into the opening through the annular sealing means, the annular sealing means being positioned axially between the fingers and the bore. Such an arrangement is particularly advantageous in preventing any possible leakage of fluid out of the bore, especially if the tube is made of extremely soft material such as vinyl which generally has a tendency to relax over time. The provision of the annular continuous bead tends to maintain engagement between the wall of the tube and the annular sealing member when the bead is located closely adjacent to the annular sealing member, i.e., when the annular sealing member is located just below the fingers and the continuous bead located immediately above and adjacent the fingers.

Also, this location of the continuous bead is important in permitting release of the tube by applying pressure to the unlocking collar at only a small point about the circumference of the tube. That is, release of the tube can be accomplished by engaging the unlocking collar and depressing same at a single point on the circumference thereof as opposed to having to apply equal pressure on opposite sides of the tube to depress the unlocking collar to engage the fingers and release the tube. Without such a bead, there might be too much play in the unlocking collar such that if pressure were only applied at a point, the unlocking collar would tend to move back and forth. In essence, with the continuous bead, the tube acts as a guide member for the unlocking collar when it is being depressed to engage the fingers to cause disengagement of the fingers from the tube.

These and further features and characteristics of the present invention will be apparent from the following detailed description in which reference is made to the enclosed drawings which illustrate a preferred embodiment of the present invention.

BRIEF DESCRIPTION OF THE DRAWINGS

FIG. 1 is a longitudinal sectional view of the coupling device of the present invention showing the gripping fingers in engagement with a tube.

FIG. 2 is a perspective view of the retaining ring of the coupling device shown in FIG. 1.

FIG. 3 is a longitudinal sectional view of the unlocking collar of the coupling device of FIG. 1, showing the continuous bead around the inside circumference thereof.

DETAILED DESCRIPTION OF THE PREFERRED EMBODIMENT

Figure 4:
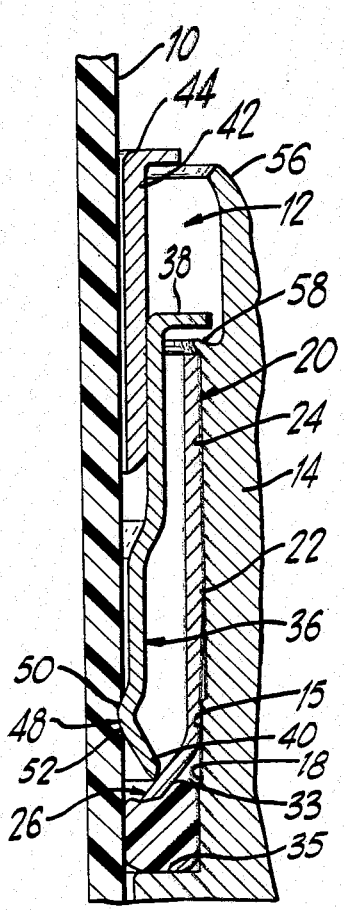
FIG. 4 is a longitudinal sectional view of a portion of the coupling device and tube shown in FIG. 1, but with the gripping portions of the fingers disengaged from the tube.

First, it should be noted that the coupling assembly of the present invention is particularly useful for coupling of tubes or conduits of all types of plastic and accordingly, the present invention will be described with reference to such tubes or conduits. However, it should be understood that copper or aluminum tubes or pipes could just as easily be used with the coupling device of the present invention. In addition, it is to be noted that the present invention is particularly useful for coupling of conduits or tubes for use in hydraulic or pneumatic equipment for automatic operations in which the coupling device provides a joint between two tubes or conduits, or a joint between the tube and the pneumatic or hydraulic component parts of the equipment. However, this is by no means the only purposes by which the present invention may be used.

With the above in mind, reference is made to FIG. 1 in which there is shown a conduit 10 of semi-rigid plastic coupled or connected to the coupling device of the present invention. The coupling device 12 includes a fitting or body 14 of suitable material which is adapted to be connected, in a suitable fashion, to either another conduit or to another component part of pneumatic or hydraulic equipment in connection with which the present invention is used. Such other connections are well known and need not be further described, although it is to be noted that if the fitting 14 at the other end is to be connected to another similar tube as the tube 10, the other end of the fitting 14 could be similarly arranged and provided with similar components as the end shown in FIG. 1.

As shown in FIG. 1, the fitting 14 is provided with a fluid communication bore 16 which provides fluid communication with the other end of the fitting. An opening 18 is provided from the exterior of the fitting 14 into the bore 16. In the embodiment shown in FIG. 1, the opening 18 comprises a series of concentrically arranged bores of progressively larger diameters in a direction towards the exterior or top of the fitting 14. While such an arrangement is convenient in providing stops or shoulders for the various components to be inserted therein, the present invention only requires an opening 18 or larger diameter than the fluid communication bore 16 for housing the various other components of the coupling device 12, to be described in further detail hereinbelow.

In the opening 18, there is provided a retaining ring 20 having a plurality of downwardly or axially extending fingers 22, which are circumferentially arranged and supported from a ring portion 24. The retaining ring 20 is completely self-supporting within the opening 18. In other words, no shoulders are formed between the ring portion 24 and the depending fingers 22 which are adapted to rest on and engage a complementary shoulder formed on the side wall defining the opening 18. Rather, the surface of the ring 24 is coextensive with the outer surface of the fingers 22 at the upper end thereof, as best seen in FIGS. 1, 2 and 4. The particular manner in which the retaining ring 20 is supported in the opening 18, and the method of manufacturing of same, will be more fully described hereinbelow with reference to FIGS. 6–12. For the present, suffice it to say that the ring or web portion 24 is comprised of a plurality of substantially straight sides which are folded or bent, as at 25, at various locations about the circumference of the finished ring 24 so as to be polygonal in shape as opposed to having a smooth circular outline.

Each of the fingers 22 includes a first gradually inclined portion 28 extending downward from the ring portion 24 and a second inclined portion 30 inclined with respect to both the first portion 28 and the ring portion 24. The gradual inclined portion 28 serves to direct the tips or ends 26 of the fingers 22 inwardly to engage the tube 10 and serves to provide an inwardly directed biasing force for the fingers 22 to cause the tips 26 thereof to engage the tube 10 upon insertion of same into the opening 18 towards the bore 16. For this purpose, the inside diameter defined by the gripping tips 26 is of a lesser dimension than the outside diameter of the tube or conduit 10.

The coupling device 12 also includes an unlocking collar 36 (see FIGS. 1, 3 and 4) which is positioned inside the retaining ring 20 within the opening 18. The unlocking collar 36 is generally cylinderically shaped and has an outwardly directed flange 38 at its upper end. The outer diameter of the collar 36 is of a lesser dimension than the inner diameter of the ring portion 24 of the retaining ring 20 so that the unlocking collar 36 may be freely movable axially relative thereto. The lower end surface 40 of the unlocking collar 36 is rounded or bevelled so that, upon axial movement downwardly of the unlocking collar 36, the lower end surface 40 will smoothly engage the second inclined portion 30 of the gripping fingers 22 and bias the fingers 22 radially outward to release the tube 10 from engagement by the gripping fingers 22 and thus from the fitting 14. In this regard, as is best seen in FIG. 4, the lower end 40 on the unlocking collar 36 only engages the second inclined tip portion 30 of the gripping fingers 22 and slides downwardly therealong as the unlocking collar 36 moves axially downward to unlock the gripping tips 26. During this unlocking movement, the lower end of the first inclined portion 28 is moved radially outward to be almost coextensive with the outer surface of the ring portion 24. In this regard, a stop surface may be provided on the wall of the fitting 14 to prevent overstressing of the fingers 22. In the preferred embodiment, this stop surface comprises a stepped surface 15 against which the lower end of the first inclined portion 28 of the fingers 22 engages when forced radially outward.

At the upper end of the unlocking collar 36, a force actuating ring 42 is force fitted into the unlocking collar 36. The outside diameter of the force actuating ring 42 is slightly greater than the inside diameter than the unlocking collar 36 so that the outside surface of the actuating ring 42 tightly engages the inside surface of the unlocking collar 36. At the lower end of the actuating ring 42, the outside surface may be slightly tapered to allow for initial insertion of same into the unlocking collar 36 or alternatively, the inside surface of the unlocking collar 36 may be slightly tapered radially outward to allow for such insertion. In any event, upon quick jamming together of the two components 36, 42, a suitable tight force fit is achieved so that the force actuating ring 42 and the unlocking collar 36 may be moved axially as a unit. The upper end of the force actuating ring 42 is provided with an outwardly directed flange 44 to provide a suitable surface on which a downwardly directed axial force can be imposed, which force is transmitted directly to the unlocking collar 36 to move same axially downward to bias the gripping fingers 22 radially outward, as described hereinabove. Also, it should be noted that the inside diameter of both the unlocking collar 36 and the force actuating ring 42 is of a slightly larger dimension than the outside diameter of the tube or conduit 10 to allow for insertion of the tube 10 into the opening 18.

Preferably, a shoulder 46 is provided at the entrance to the bore 16 to provide a stop for the tube 10 upon insertion downwardly into the opening 18 in a direction towards the bore 16. The stop shoulder 46 is positioned axially below the gripping portions 26 of the fingers 22 so that the tube 10 will be inserted far enough into the opening 18 that it will be restained against axial movement out of the opening 18. As noted above, this shoulder 46 is not necessary for operation of the present invention, but merely provides a convenient means for indicating and ensuring that the tube 10 will be gripped by the fingers 22.

To provide adequate sealing between the bore 16 and the exterior of the tube 10 to ensure a fluid tight connection, an annular sealing member 32 is provided in the opening 18 at an axial position located between the end of the bore 16 and the gripping top portions 26. More particularly, the annular sealing member 32 comprises an annular fluid tight packing ring which engages the outer wall of the tube 10 upon insertion in the opening 18 therethrough towards the bore 16, and the inner wall of the opening 18. Preferably, the fluid tight packing ring 32 comprises an O-ring made of a suitable rubber or other flexible material which has a hardness sufficient to maintain its engagement with the outer surface of the tube 10 and the wall of the opening 18 but which is flexible enough to be capable of deformation when subjected to the pressure of the fluid within the bore 16 after insertion of the tube 10 therethrough, for a purpose to be described hereinbelow.

In accordance with the present invention, the flexible O-ring 32 is positioned so that when it is subjected to the pressure of the fluid in the bore 16, it exerts an axially directed force towards the exterior of the fitting 14, and means are provided engagable by the O-ring 32 and associated with the inwardly biased fingers 22 for increasing the inward biasing force on the fingers 22 in response to the axially directed force exerted by the O-ring 32. In the preferred embodiment, this means engagable by the O-ring 32 comprises the lower radially inwardly inclined surfaces 34 of the second inclined portion 30 of each of the gripping fingers 22 which, when subjected to the axially directed force from the O-ring 32 and engaged thereby, serves to further bias the fingers 22 inwardly to maintain engagement of the fingers 22 with the tube 10. This increase in inward biasing force is further facilitated by the fact that the ends of the fingers 22 having the gripping portions 26 are spaced from the wall of the opening 18 so that the deformable O-ring 32, when subjected to the pressure of the fluid in the bore 16, may deform into the space 33 between the fingers 22 and the wall of the opening 18 and expand to force the fingers 22 inwardly. For this purpose, the O-ring 32 preferably has a hardness ranging between 50 to 70 durometers for use at operating pressures on the order of 250 psi. However, for greater operating pressures, a harder O-ring may be required.

It of course will be appreciated that this space 33 is not so large as to allow the O-ring 32 to disengage from the outer surface of the tube 10, thereby permitting fluid to leak past the O-ring 32. In this regard, the O-ring 32 located below the gripping fingers 22 is maintained in close proximity to the gripping fingers 22 by virtue of the shoulder 35 on the fitting 14 at the lower end of the opening 18. The arrangement of the coupling device 12 with a tube 10 engaged by the fingers 22 and the O-ring 32, subjected to the pressure in the bore 16 and deformed into the space 33, thereby forcing the fingers 22 radially inward, can be seen in FIG. 1.

As a result of this increase in the biasing force on the fingers 22, the possibility of the fingers 22 becoming disengaged from the tube 10 as a result of accidental pushing on the unlocking collar 36 and/or as a result of vibrations is greatly minimized. As can be appreciated, this minimization of the possibility of accidental uncoupling when the O-ring 32 is subjected to the presence of the fluid in the bore 16 is most advantageous since it is under those conditions when it is most important to ensure that the coupling is maintained.

Figure 5C:
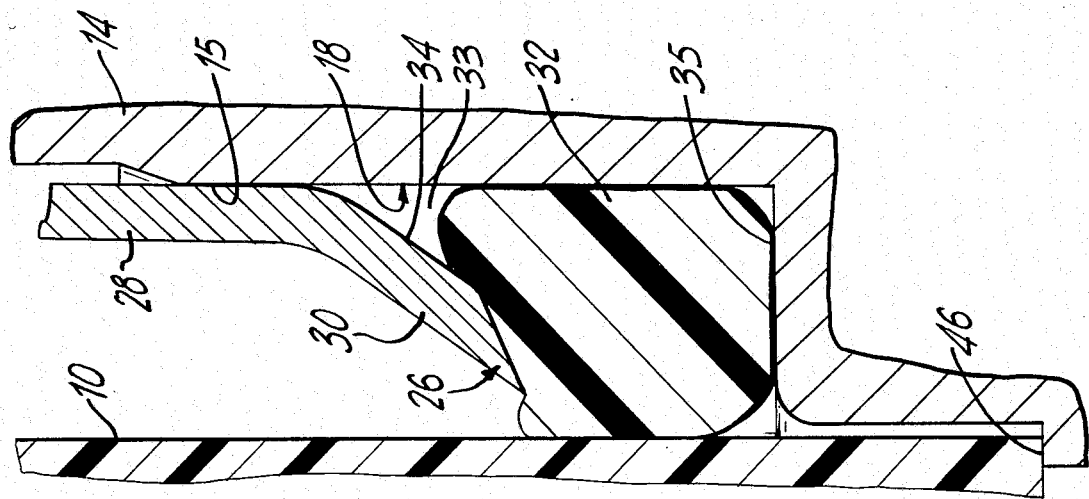
FIGS. 5a, 5b and 5c are enlarged sectional views of a portion of the coupling device shown in FIG. 1, illustrating, respectively, the configuration of the annular sealing member before insertion of a tube, with the tube inserted into the coupling device, and with the fingers moved radially outward to release the tube.
Figure 5B:
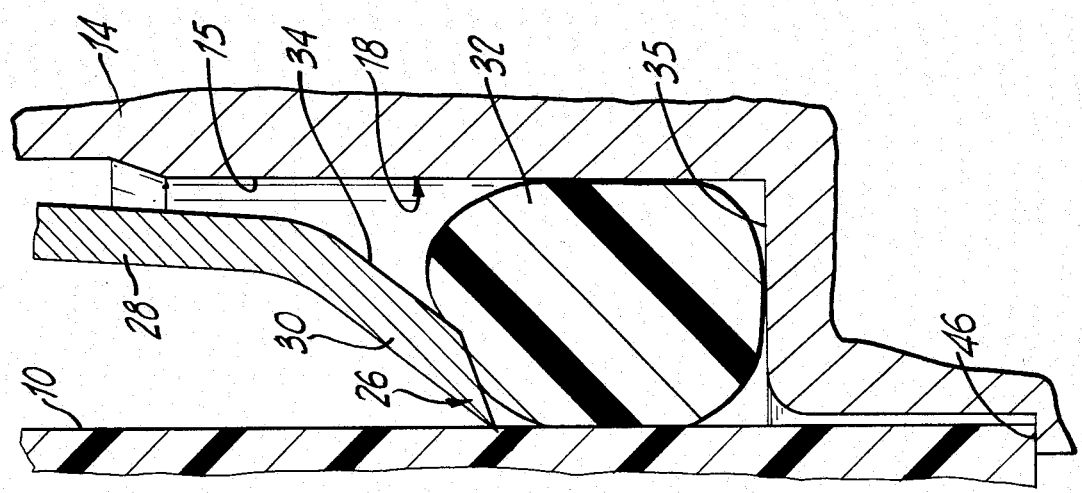
Figure 5A:
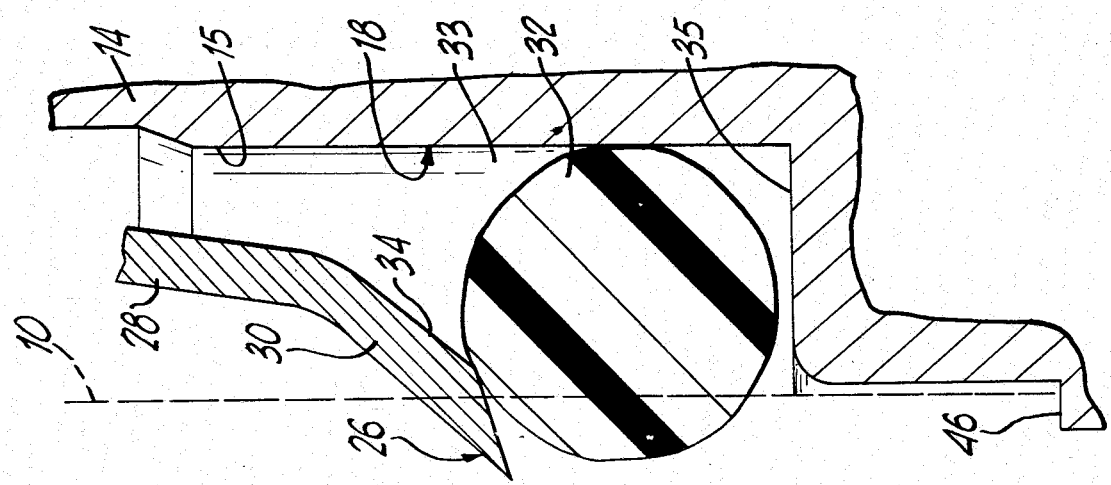
Figure 11:
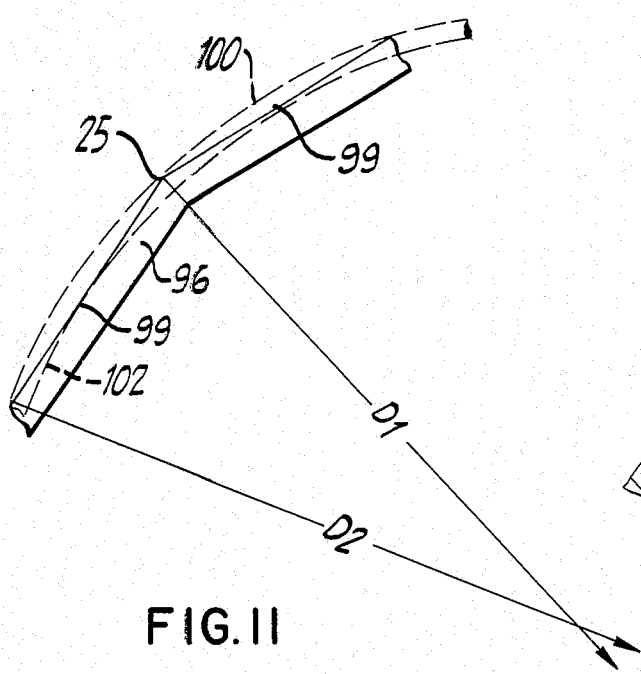
FIG. 11 is a greatly enlarged top view of a portion of the retaining ring in accordance with the present invention, illustrating the shape of the web portion.
Figure 12:
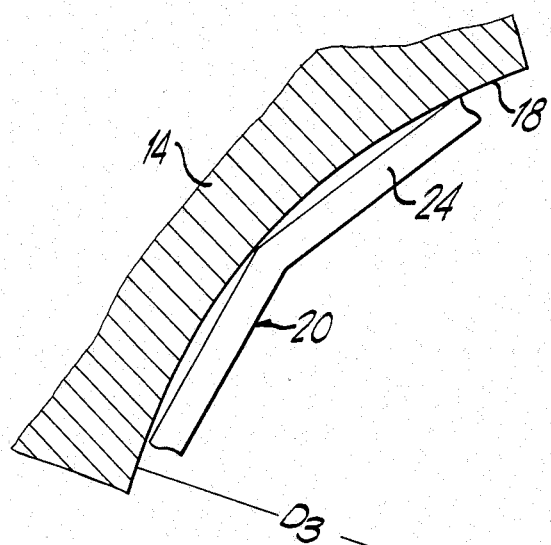
FIG. 12 is a partial sectional view taken along lines 12—12 of FIG. 1 showing a portion of the improved retaining ring of the present invention supported within the opening of the fitting.

Further in this regard, the O-ring 32 preferably is in engagement with the ends 26 of the fingers 22 at all times, i.e., before insertion of the tube 10, when the tube 10 has been inserted and is locked in place by the fingers 22 and sealed by the O-ring 32, and when the fingers 22 have been moved radially outward by actuation of the unlocking collar 36 to release the tube 10 for withdrawal from the coupling device 12. The particular configuration of the O-ring 32 in each of these positions is shown in FIGS. 5a, 5b and 5c, respectively. It will be noted in this regard, that the O-ring 32 has a substantially uniform circular cross-section before insertion of the tube 10 (see FIG. 5a), and is deformed slightly after the tube 10 has been inserted (see FIG. 5b). When the O-ring 32 is subjcted to the pressure of the fluid in the bore 16, the O-ring 32 will deform more to thereby increase the radial inward biasing force on the fingers 22 by virtue of the O-ring 32 engaging the inclined surfaces 34 of the fingers 22. Finally, when the fingers 22 have been retracted to release the tube 10 from gripping engagement (see FIG. 5c), the O-ring 32 is further deformed by the engagement of the fingers 22 and the tube 10.

This provision of the O-ring 32 always being in contact with the fingers 22, in addition to providing for increased inward biasing force on the fingers 22 when the O-ring 32 is subjected to the pressure of the fluid in the bore 16 also provides a safety feature in ensuring that a tube 10 is both locked and sealed in place. In particular, since the O-ring 32 and the fingers 22 are in engagement, when a tube 10 is inserted and pressed axially into the coupling device 12 past the fingers 22, the tube 10 will also move past the O-ring 32 and be sealingly engaged thereby. That is, only one resistance to insertion will be encountered—at the location of the fingers 22 and O-ring 32. This is in contrast to prior art arrangements wherein a series of resistances are encountered. For example, in prior art devices, if the O-ring is located axially below the elevation of the fingers, the tube will just encounter the resistance presented by the fingers and then a separate and distinct resistance presented by the O-ring. Consequently, in the prior art, even if a tube were inserted past the fingers, and thus gripped thereby, the tube might not be sealed by the O-ring. On the other hand, with the present invention, the tube 10 will move past both the fingers 22 and the O-ring 32 substantially simultaneously so that once the resistance to insertion is overcome, the tube 10 will be both locked in place and sealed.

As best seen in FIGS. 1 and 3, the unlocking collar 36 is provided at its lower end adjacent the gripping tips 26 with a continuous raised bead or dimple portion 48 on the inside surface thereof which engages the outside of the tube 10. In the preferred embodiment, the continuous bead 48 is defined by two gradual and oppositely inclined surfaces 50, 52 which extend completely around the circumference of the unlocking collar 36 at a fixed axially elevation. The lower surface 52 extends radially outward to define the lower rounded end 40 of the unlocking collar 36 and is adapted to engage the second inclined portion 30 of the retaining ring 20. This arrangement is convenient in that the unlocking collar 36 only engages the second inclined portion 30 and not the gripping tips 26 themselves during downward unlocking movement which might otherwise damage the gripping tips 26.

The provision of the continuous bead 48 on the unlocking collar 36 and particularly its location at the lower end thereof, is particularly advantageous in a number of respects. First, the bead 48 around the circumference of the unlocking collar 36 serves to center and align the tube 10 as it is inserted therethrough with respect to the gripping fingers 22, and also serves to round or make circular the tube 10 which might for example be oval in shape initially. This rounding of the tube 10 at the location of the gripping tips 26 is particularly important for ensuring that the tips 26 will engage the tube 10 about the entire circumference of the tube 10 and additionally, for ensuring that the tube 10 is round and circular at the location of the O-ring 32 which is located immediately beneath the tips 26. This feature is extremely important where the tubes or conduits 10 to be inserted into the fitting 14 are made of especially soft plastic material, such as vinyl, which has a tendency to relax over time and which might otherwise adversely affect the gripping of the tube 10 and/or the sealing with the O-ring 32 located immediately adjacent beneath the tips 26. Thus, the possibility of leakage with soft plastic materials such as vinyls is minimized with this arrangement of the continuous bead 48.

Further still, the continuous bead 48 at the lower end of the unlocking collar 36 is important for permitting the release pressure or force at the end of the force actuating ring 42 to be applied at a single location about the circumference of the tube 10 as opposed to having to apply the unlocking force or pressure on opposite sides of the tube 10 to minimize the possibility of skewing of the unlocking collar 36. That is, without a continuous bead 48, there may be too much play between the surface of the tube 10 and the unlocking collar 36 such that when a pressure is applied only at a point on the force actuating ring 42, the unlocking collar 36 may tend to move sidewards and become skewed, and thereby not engage the gripping fingers 22 evenly about the circumference. On the other hand, with the bead 48 located at the lower end of the unlocking collar 36, the tube or conduit 10 will in effect act as a guide for the unlocking collar 36 during its downward movement to unlock the gripping fingers 22 evenly.

While in the embodiment shown in FIG. 1, the tube 10 is made of a plastic material (i.e., hard plastic, semi-rigid plastic or soft plastic) to allow for deformation thereof as the tube 10 is inserted past the continuous bead 48 on the unlocking collar 36 and the unlocking collar 36 is made of metal, in practice, the tube 10 may be metal in which case it would be desirable to use a plastic type material for the unlocking collar 36. Then, it would be the continuous bead 48 which is slightly deformed upon insertion of the tube 10 as opposed to the outside surface of the tube 10.

The upper end of opening 18 of the fitting 14 is initially provided with an upwardly extending collar 56 to allow for insertion into and assembly in the opening 18 of the O-ring 32, the retaining ring 20 and the unlocking collar 36. Specifically, the O-ring 32 is first inserted in the opening 18 and moved downwardly on the shoulder 35 near the lower end of the opening 18. Next, the retaining ring 20 is inserted above the O-ring 3 and moved into position with the gripping fingers 22 being located just above the O-ring 32.

As noted above, the retaining ring 20 is self-supporting within the opening 18 by engagement of the ring portion 24 thereof with the side walls of the opening 18. Also, if the retaining ring 20 is manufactured from shell brass and the fitting 14 from body brass (conventional materials for coupling devices), when the retaining ring 20 is inserted (by means of a suitable machine or tool) into the opening 18, the corners 25 of the ring 20 will nick or scrape the wall of the fitting 14 so that a slight ledge is provided on the wall (not shown) at each corner 25 of the retaining ring 20. This serves to lock the axial location of the retaining ring 20 in the opening 18 of the fitting 14 to prevent the retaining ring 20 from moving further into the opening 18. That is, under normal force in inserting a tube 10 into the device 12, the ring 20 will not be pushed further into the opening 18; rather, the position of the retaining ring 20 will remain fixed. It should be noted here that the machine or tool which forces the retaining ring 20 into the opening 18 applies a greater force than would normally be experienced by the retaining ring 20 when a tube 10 is inserted therethrough.

After the retaining ring 20 is inserted, a lip 58 machined on the surface of the opening 18 is swaged radially inward to prevent the retaining ring 20 from being moved out of the opening 18. However, it should be noted that this lip 58 is not necessary, as noted hereinbelow. Next, the unlocking collar 36, with the actuating ring 42 joined thereto, is inserted inside the retaining ring 20. After insertion of all the components into the opening 18, the collar 56 of the fitting 14 is swaged inwardly and downwardly to provide a blocking-type relationship with respect to the components in the opening 18. It will be noted with reference to FIG. 1, that the upper flange 44 of the force actuating ring 42 is axially positioned above the swaged collar 56.

The improved retaining ring 20 having the axially extending inwardly biased fingers 22 as shown in FIG. 2 is manufactured in accordance with one aspect of the invention of application Ser. No. 912,003 now U.S. Pat. No. 4,440,424 which, as noted therein, results in a significant cost savings for the finished retaining ring 20, as well as providing a significantly improved retaining ring 20. In this regard, in the prior art, metallic retaining rings are generally manufactured by first forming a cup shaped member from a metal blank, such as for example, by drawing, bending or peening the metal. After this step, the bottom and portions of the sides of the cup-shaped member are cut or punched to form a ring shaped member having depending fingers. The fingers could then be bent inwardly to bias same radially inward or, if the sides of the cup shaped member were initially sufficiently inclined, no further bending was necessary. As can be appreciated, there was a substantial waste of metal with such a manufacturing process. In fact, it was found that such methods resulted in 75% waste, the weight of the formed retaining ring only comprising approximately 25% of the weight of the blank from which it was formed. However, with the manufacturing process in accordance with the invention of application Ser. No. 912,003, now U.S. Pat. No. 4,440,424 only approximately an additional 20% of the finished weight of the metal retaining ring is necessary for manufacture. This is significantly less than the additional 300% of the finished weight of the material which was required by the prior art.

In addition to the improved manufacturing process for manufacturing retaining rings, the resulting retaining ring 20 itself is improved and possesses a number of advantageous features over the prior art metallic retaining rings. However, before turning to a discussion of the features and advantages, the process of manufacturing the improved retaining ring 20 will be described with reference to FIGS. 6-12.

Figure 6:
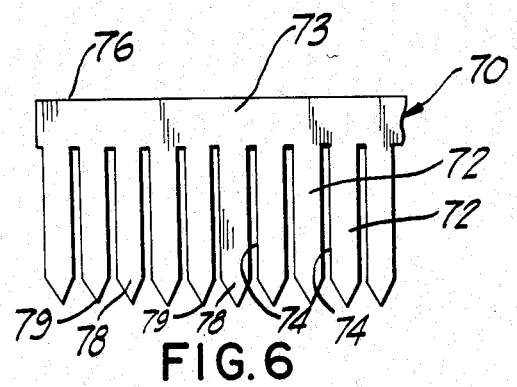
FIG. 6 is a plan view of a portion of a metallic plate which has been cut, illustrating one step in the manufacturing process for a retaining ring in accordance with the present invention.

Referring to FIG. 6, a flat metal blank 70 is first cut to form a plurality of elongated fingers 72 extending from and integral with an upper web portion 73. This cutting can be accomplished, for example, by cutting or punching, with conventional metal cutting tools or dies, a plurality of substantially parallel grooves 74 which extend from edge of the metal blank 70 inwardly towards the opposite edge 76 but not across full width of the blank 70. Also, preferably, the tips 78 of the formed elongated fingers 72 have been cut to form a substantially pointed end, as at 79. These tips 78 will form the gripping tips 26 of the finished retaining ring 20. As can be seen from FIG. 6, because of the closeness between the adjacent fingers 72, the only waste comprises the metal cut from the grooves 74. As noted above, this waste is preferably on the order of 20% of the surface area remaining after cutting.

Figure 7:
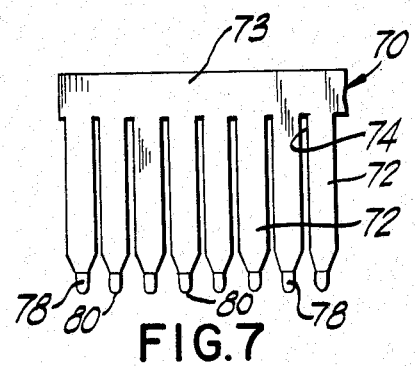
FIGS. 7 and 7a are a plan view and a side view, respectively, showing the tips of the fingers flatten, illustrating another step in the manufacturing process for a retaining ring in accordance with the present invention.
Figure 7A:
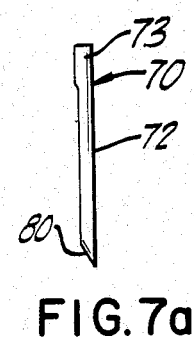

Next, referring to FIGS. 7 and 7a, the pointed tips 78 of the formed elongated fingers 72 are flattened, such as for example by peening or by compressing such tips 78 between a pair of die members, so that the thickness of the metal blank 70 at the tips 78 is much thinner than the remainder. This flattening step rounds and expands the surface area of the tips, as shown at 80, and serves to provide sharp edges on the fingers 72 for gripping purposes. In addition, it will be noted that the tips 78 of the fingers 72 comprise opposed substantially planar or flat surfaces which converge toward one another at the tip 78. This is in contrast to the prior art gripping tips which are curved about the length of the fingers 72.

Figure 8:
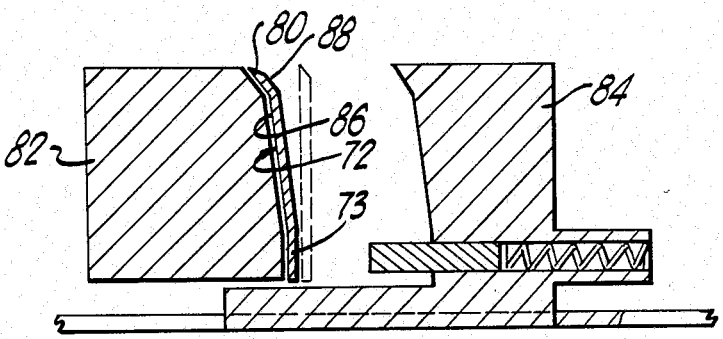
FIG. 8 is a schematic diagram illustrating the bending of the fingers formed in the metallic plate shown in FIGS. 6 and 7 relative to the web portion, illustrating another step in the manufacturing process for the retaining ring in accordance with the present invention.

Next, referring to FIG. 8, the cut and pressed metal blank 70 is fed to a bending station comprised of male and female die members 82, 84 respectively, which serves to bend or incline the fingers 72 out of the plane of the flat web portion 73. The blank 70, prior to bending, is shown in dotted outline in FIG. 8. At the bending station, the web portion 73 of the metal blank 70 remains flat, and the portion 86 of the fingers 72 integral with and depending from the web portion 73 are bent or inclined gradually with respect to the flat surface of the web portion 73. Upon continued action of the dies 82, 84 toward one another, the ends 88 of the fingers 72 are further inclined with respect to the portion 86 and the web portion 73. The precise shape of the metal blank 70 when it leaves the die members 82, 84 is shown in solid outline in FIG. 8 and corresponds to the shape of the fingers 22 of the finished retaining ring 20 shown in FIGS. 1 and 4—namely, portions 86 and 88 corresponding to inclined portions 28 and 30 respectively. It is to be noted that in practice, the cutting, flattening, and bending of the metal blank 70, as shown in FIGS. 6, 7, and 8 can take place in sequence with a continuous strip of metal, which is then severed into appropriate lengths prior to the next bending operation.

Figure 9:
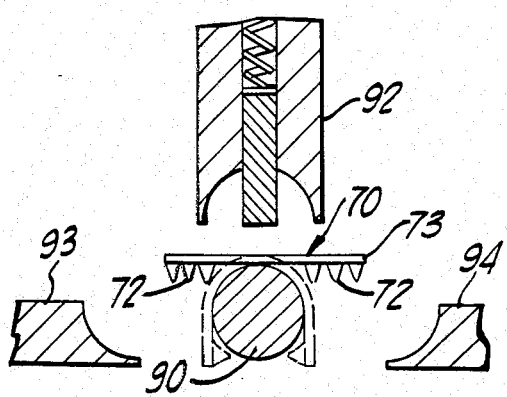
FIGS. 9 and 10 show schematically the bending of the web portion of the metallic plate about a circular form to produce the metallic retaining ring in accordance with the present invention.
Figure 10:
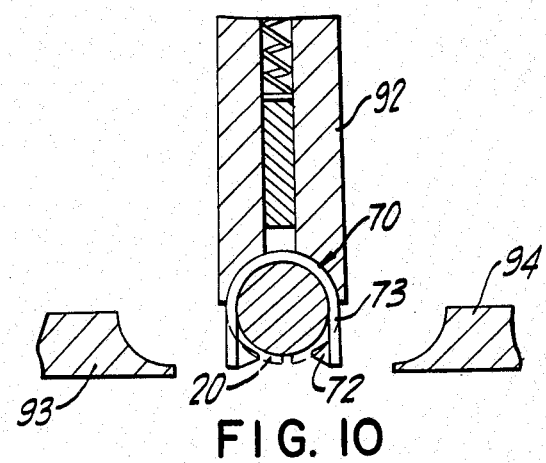

After the fingers 72 are inclined with respect to the flat web portions 73, the metal blank 70 is delivered to a bending or forming station which is represented schematically in FIGS. 9 and 10. There, the metal blank 70, whose length corresponds substantially to the circumference of the finished metallic retaining ring, is first folded or bent about its mid-point around a substantially circular male die member 90 by means of a female die member 92 to bend the web portion 73 into a U-shaped cross section, as shown in dotted outline in FIG. 9. During this bending operation, the inclined fingers 72 are directed downwardly and under the male die 90. Thus, only the web portion 73 of the metal blank 70 is folded around the circular male die member 90. After the web portion 73 is formed into the U-shaped cross-section, two side female members 93, 94 complete the bending or folding of the ends of the metal blank 70 about the circular male die member 90, as shown in dotted outline in FIG. 10, so that the web portion 73 has a substantially circular cross-section.

The finished retaining ring 20 is shown in perspective in FIG. 2, the web portion 73 corresponding to the ring portion 24, and the fingers 72 corresponding to the fingers 22. As noted, during the final folding operation about the circular die member 90, the web portion 73 of the metal blank 70 takes on a substantially closed circular shape. However, in actuality, this closed circular shaped web portion 24 is comprised of a plurality of substantially straight sides 96 which are folded or bent as at 25, at various placed about the circumference of the finished ring 20. In other words, instead of forming a smooth circular outline, the web portion 24 is actually polygonal in shape. As seen in FIG. 2, the sides 96 of the web portion 24 define a plurality of corners 25 which lie directly in line with the grooves 74 formed between adjacent fingers 22 depending axially downward from the web portion 24. This results from the fact that the integral connection of the fingers 22 to the web portion 24 provide a substantially stronger resistance to bending than is provided above the grooves 74 between adjacent fingers 22. Thus, during the bending about the circular male die member 90, bending of the web portion 73 occurs in the less resistant areas aligned with the grooves 74, thereby resulting in a polygonal cross-section for the finished retaining ring 20.

This shape for the web portion 24 is particularly advantageous in order to provide a self-supporting retaining ring 20. As particularly shown in FIG. 11, an imaginary circle 100 having a diameter $D_1$ can be defined with passes through the outside corners 25 of the web portion 24. The diameter $D_1$ is greater than the diameter $D_2$ of another imaginary circle 102 which passes through the mid-points 99 of the outside surfaces forming the straight sides 96 of the web portion 24. If the diameters $D_1$ and $D_2$ of the circle 100 and 102 respectively, are such that the diameter $D_1$ is greater than the inside diameter $D_3$ of the opening 18 in the fitting 14, and the diameter $D_2$ is less than the diameter $D_3$ of the opening 18, the retaining ring 20 will be self-supporting when it is placed within the opening 18.

In order to insert the retaining ring 20 into the opening 18, the corners 25 of the web portion 24 of the ring 20 must be compressed inwardly. This in turn causes the web portion 24 to distort slightly so that the mid-points 99 of the sides 96 are bowed slightly outward. In other words, to insert the retaining ring 20 into the opening 18, the web portion 24 must be temporarily forced into a more circular shape. As the web portion 24 tends to want to return to its original polygonal shape, the corners 25 exert a force radially outward which is sufficient to hold the retaining ring 20 in axial position within the opening 18 once it is set into place. The difference between the diameter $D_1$ of the imaginary circle 100 passing through the corners 25 and the inside diameter of $D_2$ of the opening 18 need only be on the order of 0.001-004 inch when the diameter $D_3$ is on the order of 0.5 inch. Thus, the radial compression which forces the retaining ring 20 into more circular shape serves to lock the ring 20 into axial position within the opening 18.

Further, it should be noted that the force exerted by the corners 25 will be more evenly distributed about the circumference of the opening 18 as the number of sides 96, and thus the number of corners 25, increases. In this regard, it should be noted that the number of sides 96 is increased by increasing the number of fingers 22 for the retaining ring 20. For example, it has been found desirable to utilize a retaining ring 20 having at least 8 fingers 22 and more preferably at least 16, as, for example, shown in FIG. 2. Therefore, it is not necessary to provide complimentary shoulders formed in the opening 18 and on the retaining ring 20.

In addition to being self-supporting within the opening 18 in the fitting 14, the retaining ring 20 also possess a number of other advantages over prior art retaining rings. Most important in connection with the present invention is the fact that the gripping portions 26 at the ends of the fingers 22 are very smooth and do not have any burrs or serrations which might otherwise mar or scratch the tube 10 upon insertion of the tube 10 into the fitting 14 past the fingers 22. That is, the gripping tips 26 have a very smooth edge past which the tube 10 may easily slide without scratching or marring. This smooth edge is the result of the cutting and peening operations in the manufacturing process for producing the retaining ring 20.

More specifically, in accordance with the manufacturing process described above, the flat metal blank 70 is initially cut to form a series of grooves 74 to define the fingers 72. This cutting operation would normally leave a small burr on one edge of the cut stock. For example, referring to FIG. 7a, if the flat blank 70 were cut with a suitable cutting tool moving from left to right, the right hand edge of the cut stock 70 in FIG. 7a would normally have a burr thereon. However, this cutting operation is made on flat stock which is relatively thin, and will normally leave less of a burr on the rear edge than that left as a result of a punching type cutting operation used in the manufacture of prior art retaining rings. Further, it is to be noted that during the peening or flattening operation, if this edge having the burr is supported by a back support surface and peened from the left hand side, the peened material will spread outwardly over the back or right hand edge of the tips 78 which in effect reduces the burr in the lower surface. Thus, the cutting operation of cutting flat stock 70 in the manufacturing operation tends to leave less of a burr, and whatever burr is left is reduced further in the peening operation which serves to spread the material outwardly over the burred edge, thereby leaving and producing a very smooth edged end or tip 78. This is particularly true when materials such as brass are used for the retaining ring which spreads out quite easily during the peening operation. This spreading of the material can be seen from a comparison of FIGS. 6 and 7 which shows the cut shape of the tips 78 prior to peening and the spread out shape at the tips 78 after peening.

Also, it is to be noted that with the retaining ring 20 of the present invention which is manufactured from a relatively thin metal stock 70, as opposed to prior art retaining rings which are manufactured from relatively thick stock, the elasticity of the formed fingers 22 of the retaining ring 20 of the present invention is much greater than the elasticity of the gripping fingers of the prior art retaining rings which are relatively thick-walled. (It should be noted however that the inward biasing force on the fingers 22 of the retaining ring 20 of the present invention for gripping purposes is still relatively great by virtue of the O-ring 32 acting thereon during normal operation of the coupling device 12.) Therefore, upon insertion of the tube 10 past the fingers 22, the fingers 22 in the present invention have a greater tendency to be moved out of the way to allow passage of the tube 10 whereas the fingers of the prior art, being less elastic, tend to grip into, mar and scratch the surface of the tube 10 upon insertion.

Further, it is to be noted that each of the fingers 72 has a first depending portion 86 which is bent out of the plane of the web or ring portion 73 and a second inclined or bent portion 88 inclined further out of the plane of the web portion 73. Thus, after the blank 70 is rolled, the tips or ends 78 of the fingers 72 will be radially inward of the corresponding web section 73 and thus more closely adjacent to one another than the spacing of the fingers 72 at the location where the fingers 72 are joined to the web portion 73. That is, because the fingers 72 are inclined radially inward, the tips 78 of the fingers 72 are much more closely spaced from one another than the remaining portions of the fingers 72 along their length thereof. The effect of this close spacing can be seen in FIG. 14 which shows a partial plan view of the retaining ring with the gripping tips 26 of a relatively large number of fingers being closely spaced from one another so as to form an almost solid ring at the location of the gripping tips 26, even though there is a somewhat larger spacing between each of the individual fingers 22 at intermediate portions along the length thereof. This, as can be appreciated, is advantageous in providing increased gripping action to hold a tube 10 inserted therethrough. This close spacing of the tips 26 of the fingers 22 is also important in the retaining ring 20 serving as a retainer for the O-ring 32 to maintain the O-ring 32 in position below the fingers 22 and in engagement with the tube 10.

Also, this close spacing of the gripping fingers 22 at the ends 26 thereof is important in preventing or at least minimizing the possibility of a tube 10 being pulled outwardly from the fitting 14, or because of possible pressure differences, being pushed out of the fitting 14. In this regard, it is to be noted that if a force were applied to the tube 10 in an axial direction out of the fitting 14 (such as if someone should grab the tube 10 and attempt to yank it out of the fitting 14) such action might possibly tend to cause the fingers 22 to bend upwardly, such as at the location where the two inclined portions 28, 30 meet. If the fingers 22 were spaced far enough apart from one another, and if a large enough force were applied to the tube 10, there is a possibility that the fingers 22 would simply bend upwardly to assume an upward inclined position and the tube 10 thereby released out of the fitting 14.

On the other hand, in accordance with the present invention, the fingers 22 are closely spaced together so that any upwardly directed force on the tube 10 which might tend to cause the fingers 22 to bend would result in the fingers 22 coming into contact with one another after only a very small bending, i.e., the gripping tips 26 would engage one another at an axial location closely adjacent to the location of the gripping tips 26 when the tube 10 is inserted, and in particular at an elevation below the axial elevation of the bending line between the first and second inclined portions 28, 30. That is, if the fingers 22 were caused to bend about the bending line between the first and second inclined portions 28, 30, they would come into contact with one another to form a completely closed ring before the fingers 22 would otherwise move past the axial elevation of the bending line.

Figure 13:
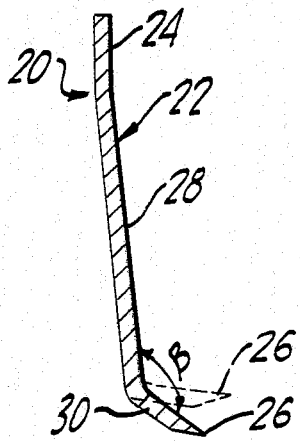
FIG. 13 is a side view of a gripping finger of the retaining ring in accordance with the present invention.
Figure 14:
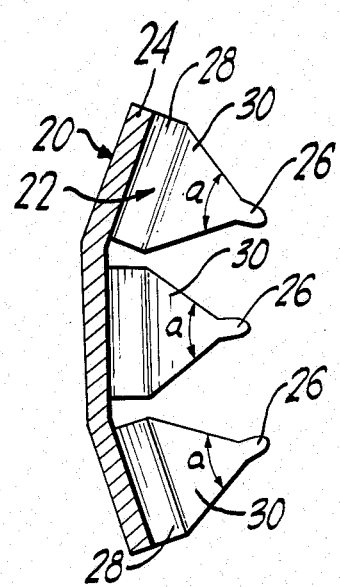
FIG. 14 is a sectional view of the retaining ring in accordance with the present invention, taken along lines 14—14 of FIG. 1 with the unlocking collar and tube removed for clarity to illustrate the ends of the gripping fingers.
Figure 15:
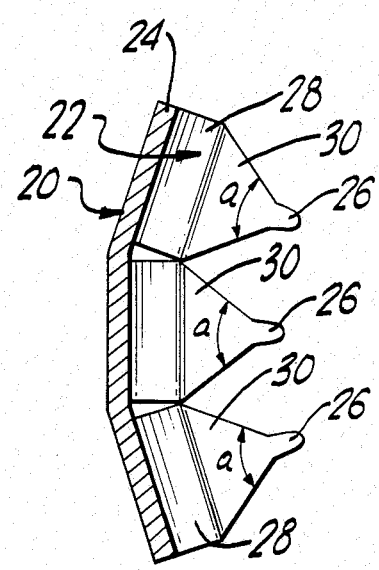
FIG. 15 is a partial plan view, similar to that shown in FIG. 14, but showing the fingers engaging one another after having been bent about the bending line for the inclined ends of the gripping fingers as shown in FIG. 13.

This for example can be seen with reference to FIGS. 13–15. Specifically, in FIG. 13, the normal position of the fingers 22 is shown in solid outline and the position of the fingers 22 after having been bent through a small angle to contact one another to form a substantially closed ring is shown in dotted outline. FIG. 14 is a plan view of a portion of the ends 26 of the gripping fingers 22 of the retaining ring 20 in which the fingers 22 are in their normal position with the tips 26 slightly spaced from one another (i.e., corresponding to the position of the fingers 22 shown in solid outline in FIG. 13), whereas FIG. 15 is a plan view of a portion of the gripping fingers 22 in which the fingers 22 have been bent upwardly slightly so that the gripping tips 26 engage one another (i.e., corresponding to the portion of the fingers 22 shown in dotted outline in FIG. 13). As can be seen in FIG. 13, when the lower ends of the fingers 22 come into contact with one another, the fingers 22 are still inclined downwardly, the engagement of the lower ends of the fingers cooperating to prevent further bending of the fingers 22 upwardly about the bending line, and thus minimizing the possibility of the tube 10 being yanked or pushed out of the fitting 14.

Also, this feature of the ends of the fingers 22 coming in contact with one another upon bending of the fingers 22 upwardly serves to limit the amount of penetration of the tips 26 of the fingers 22 into the tube 10. Specifically, the gripping tips 26 once adjacent fingers 22 engage or contact one another, will be prevented from penetrating or moving further into the wall of the tube 10. This is important so as not to destroy the seal and/or sever the tube 10.

In this regard, it is preferable that a relatively large number of fingers 22 be provided, say on the order of at least eight, and more preferably at least 16 for use with $\frac{1}{4}''$ tubing, although greater number of fingers 22 could also be provided. Also, the lower ends of the fingers are preferably inclined at an angle $\beta$ (see FIG. 13) of from 115° to 160° and more preferably at least 145°±5°. Further, and as an example for use with $\frac{1}{4}''$ tubing, and further depending on the number of fingers 22 and the angle of inclination $\beta$, the spacing between the fingers 72 at the ring portion 73 (i.e., the width of the grooves 74) is preferably on the order of 0.020 to 0.030 inches (and preferably 0.025 inches) with the width of each of the fingers 22 being from 0.50 to 0.70 inches (and preferably about 0.057 inches) for a retaining ring manufactured from 0.015 inches thick spring brass. Of course, it will be appreciated that these parameters would change for different materials and different diameter tubing. For example, if the tubing is greater than $\frac{1}{4}''$, a greater number of teeth or fingers 22 would be preferable.

Still further, it is to be noted that because the gripping tips 26 are pointed or angled with respect to the sides of the fingers 22, it is the sides of the fingers 22 at the lower ends which will come into contact with one another to form a continuous ring and not the tips 26 themselves. This is preferable in that the fingers 22 at this location are wider than at the tips 26 and therefore closer to the edges of the adjacent fingers 22 than the tips 26 themselves. At the same time however, the tips 26 preferably include an angle $\alpha$ (see FIG. 14) from 15° to 45° (and more preferably 30°) so that the side edges will be closely spaced radially with respect to the tube.

Figure 16:
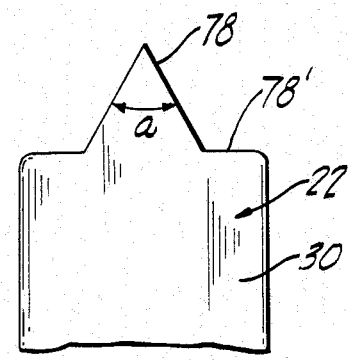
FIG. 16 is a greatly enlarged plan view of an alternative embodiment of the gripping ends of the fingers of the retaining ring in accordance with the present invention, prior to the step of flattening the ends in the manufacturing process for the retaining ring.
Figure 17:
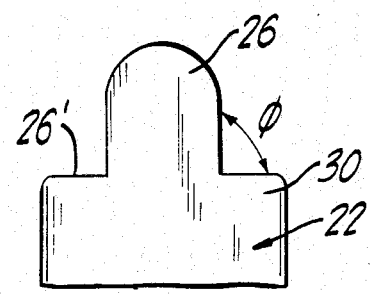
FIG. 17 is a plan view similar to that shown in FIG. 16 but illustrating the fingers after having been flattened in the manufacturing process for the retaining ring in accordance with the present invention.

Further in this latter regard, the tips 26 of the gripping fingers 22 may preferably be provided with a step or shoulder 26' to limit the penetration or bite of the tips 26 into the tube 10 which is particularly advantageous for especially soft surfaced tubing such as vinyl or polyethelene. In this regard, FIG. 16 shows a greatly enlarged plan view of one of the tips 78 after the cutting step to define the tips 78 and shoulder 78' but prior to the flattening operation. After peening or flattening, the tips 78 assume a shape as shown in FIG. 17 for the gripping tips 26 of the retaining ring 20 which provides a shoulder or step 26' for limiting penetration of the tips 26 into the tube 10. It will be appreciated that if the fingers 22 were bent about the first bending line between the first and second inclined portions 28, 30, the outer edges of the shoulders 26' and not the tips 26 will come into contact with one another. The angle $\phi$ included between the side edges of the cut tip 26 is preferably from between 70° to 145°, and preferably 90°. Also, for fingers 22 which are of a width of about 0.057 inches for $\frac{1}{4}''$ tubing desgin, the shoulders 26' formed by cutting are each preferably on the order of 0.010 inches.

Thus, the retaining ring 20 in accordance with the present invention has a plurality of depending fingers 22 which are inclined radially inward, and spaced about the retaining ring 20 in a manner so as to ensure that the fingers 22 at the ends thereof, or adjacent the tips 26, if bent or inclined further radially inward about a predetermined line of inclination or bending, will contact one another at an axial location which is below the axial location of the bending line. Such a bending of the fingers 22 will form a substantially continuous ring about the circumference of the tube 10 and prevent the fingers 22 from bending about the transverse bending line and prevent release of the tube 10 from the fitting 14. In this regard, the number of fingers 22, the spacing between the fingers 22, the angle of inclination $\beta$ and the angle $\alpha$ of the tips 26 are all factors which may be varied depending upon the particular tube diameter, for which the retaining ring 20 is designed, as noted above.

Thus, it is seen that the present invention provides an improved coupling device 12 for a fluid conduit or tube 10. The tube 10 is inserted through a force actuating ring 42 and unlocking collar 36 (which have been force fitted together) into an opening in the fitting 14 of the coupling device 12. The end of the tube 10 is forced downwardly through a raised bead portion 48 on the inside surface of the unlocking collar 36, below gripping portions 26 on the fingers 22 of the retaining ring 20 in the opening 18, and through an annular sealing ring 32. The fingers 22 are normally biased radially inwardly so that the gripping portions 26 directly hold and restrain the tube 10 against axial movement on the fitting 14. When it is desired to remove the tubing 10 from the fitting 14, the force actuating ring 42 is depressed downwardly, and by virtue of its connection to the unlocking collar 36, forces the unlocking collar 36 to also move axially downward. The lower end 40 of the unlocking collar 36 engages the inclined surfaces 30 of the fingers 22 and forces the fingers 22 radially outward to release the gripping portions 26 from engagement with the tube 10. While the unlocking collar 36 is maintained in downward position, the tube 10 may be simply withdrawn from the fitting 14. In this regard, the raised bead 48 on the unlocking collar 36 serves to maintain alignment of the tube 10 with respect to the fingers 22 and to ensure an even axial unlocking force being applied to the fingers 22 to release the tube 10.

When the tube 10 is initially inserted into the coupling 12, the O-ring 32 serves to prevent any leakage of fluid between the bore 16 of the fitting 14 and the tube 10. When the O-ring 32 is subjected to the pressure of the fluid in the bore 14, it serves to increase the radially inward biasing force on the fingers 22 to maintain engagement of the fingers 22 with the tube 10 and prevent accidental unlocking of the tube 10 from the coupling device 12. Also, by virtue of the O-ring 32 always remaining in contact with the fingers 22, only a single location of resistance is encountered in inserting a tube 10 into the device 12, thereby ensuring that the tube 10 will be both locked and sealed after the resistance to insertion is overcome.

Further, according to another aspect of the present invention, the fingers 22 are each provided at the gripping tips 26 thereof with opposed planar surfaces which are substantially flat and which have very smooth edges so as not to mar or scratch the surface of the tube 10 during insertion. In this regard, the fingers 22 themselves have a rectangular cross-section along substantially their entire length. As the retaining ring 20 has been formed from a flat metal blank 70 which has been cut, peened, bent and rolled into a ring shape having radially inward inclined fingers 22 also possess superior elasticity properties so as not to scratch or mar the surface of the tube 10 upon insertion, as well as having superior gripping edges also.

Still further, the depending fingers 22 are spaced and inclined radially inward from one another in a manner such that if the fingers 22 are subjected to an axial force bending the fingers 22 about a bending line at a first predetermined axial location, the fingers 22 would engage one another, prior to the tips 26 of the fingers moving axially upward past such predetermined axial location. In this way, the retaining ring 20 will be locked in position to retain the tube 10, even if subjected to high axial forces such as by yanking or great pressure differences acting on the tube 10.

While the preferred embodiment of the present invention has been shown and described, it will be understood that such is merely illustrative and that changes may be made without departing from the scope of the invention as claimed.

What is claimed is:

1. A releasable coupling device for a tube of the type including a fitting having a bore therein and an opening into the bore through which the tube is to be inserted, the internal diameter of said opening being greater than the diameter of said bore, and said opening having a first end adjacent said bore and a second end opened to the exterior of said fitting; a retaining ring in said opening having a plurality of axially extending, inwardly biased fingers adapted to engage said tube when said tube is inserted into said fitting towards said bore so that said tube is restrained against axial movement out of said fitting; unlocking means for forcing said plurality of fingers radially outward to cause disengagement of said fingers from said tube; annular sealing means positioned in said opening for sealing said tube and said fitting when said tube is inserted therethrough, the improvement comprising;

each of said fingers having gripping portions at the ends thereof for engaging said tube, said gripping portions having opposing substantially planar surfaces, said fingers along their entire length having a substantially rectangular cross-section, and said retaining ring being comprised of a multi-sided web portion having a plurality of sides in which adjacent sides define a plurality of corners, each of said fingers depending from one of said sides of said multi-sided web portion.

2. A releasable coupling device for a tube of the type including a fitting having a bore therein and an opening into the bore through which the tube is to be inserted, the internal diameter of said opening being greater than the diameter of said bore; a retaining ring in said opening having a plurality of axially extending, inwardly biased fingers adapted to engage said tube when said tube is inserted into said fitting towards said bore so that said tube is restrained against axial movement out of said fitting; and unlocking means for forcing said plurality of fingers radially outward to cause disengagement of said fingers from said tube, the improvement comprising:

said axially extending, inwardly biased fingers being substantially planar along their axial length, the ends of each of said fingers being inclined radially inward at a first predetermined axial location between the ends of said fingers and said retaining ring, and said fingers being spaced about said retaining ring a predetermined distance from one another such that said fingers engage one another at a second predetermined axial location when said fingers are bent radially inward about a line at said first predetermined axial location, said second predetermined axial location being between said first predetermined axial location and the axial location of the ends of said fingers before said fingers are bent radially inward about said line at said first predetermined axial location.

3. The improved releasable coupling device of claim 2 wherein each of said fingers includes a first inclined portion inclined radially inward at said first predetermined axial location and a second inclined portion inclined radially inward at an axial location between said first axial location and said retaining ring.

4. The improved releasable coupling device of claim 2 wherein the ends of each of said fingers includes a tapered portion tapering to a tip, and wherein adjacent fingers engage one another at a point along their length intermediate said tips and said first predetermined axial location at said second predetermined axial location when said fingers are bent radially inward about a line at said first predetermined location.

5. The improved releasable coupling device of claim 2 wherein the ends of each of said fingers includes a shoulder defining a tip portion of said fingers between said shoulder and the end of said fingers, and wherein adjacent fingers engage one another at a point along their length intermediate said tip portion and said first predetermined axial location at said second predetermined axial location when said fingers are bent radially inward about a line at said first predetermined axial location.

6. The improved releasable coupling device of claim 2 wherein said predetermined spacing between said fingers at said retaining ring ranges from 0.020 to 0.030 inches.

7. The improved releasable coupling device of claim 2 wherein said plurality of fingers is at least 16.

8. The improved releasable coupling device of claim 3 wherein said first inclined portion is inclined radially inward from between 115° to 160° with respect to the second inclined portion.

9. The improved releasable coupling device of claim 4 wherein said tapered tip includes an angle from between 15° to 45°.

10. The improved releasable coupling device of claim 5 wherein the angle between said shoulder and said tip ranges between 70° and 145°.

* * * * *

UNITED STATES PATENT AND TRADEMARK OFFICE
CERTIFICATE OF CORRECTION

PATENT NO. : 4,508,369
DATED : April 2, 1985
INVENTOR(S) : Paul Mode

It is certified that error appears in the above-identified patent and that said Letters Patent is hereby corrected as shown below:

On the title page, the Assignee should read --Nycoil Company--.

Signed and Sealed this

Twenty-second Day of October 1985

[SEAL]

Attest:

DONALD J. QUIGG

*Attesting Officer*

*Commissioner of Patents and Trademarks—Designate*